United States Patent [19]

Moreno

[11] Patent Number: 5,669,001
[45] Date of Patent: Sep. 16, 1997

[54] OBJECT CODE COMPATIBLE REPRESENTATION OF VERY LONG INSTRUCTION WORD PROGRAMS

[75] Inventor: Jaime Humberto Moreno, Hartsdale, N.Y.

[73] Assignee: International Business Machines Corporation, Armonk, N.Y.

[21] Appl. No.: 410,431

[22] Filed: Mar. 23, 1995

[51] Int. Cl.$^6$ .................................................... G06F 9/44
[52] U.S. Cl. ................................................................ 395/706
[58] Field of Search ................. 364/DIG. 1 MS File, 364/DIG. 2 MS File; 395/376, 380, 381, 382, 580, 700, 705, 706, 707, 708, 709, 710

[56] References Cited

U.S. PATENT DOCUMENTS

| | | | |
|---|---|---|---|
| 5,317,734 | 5/1994 | Gupta | 395/650 |
| 5,442,790 | 8/1995 | Nosenchuck | 395/700 |
| 5,526,499 | 6/1996 | Bernstein et al. | 395/375 |

OTHER PUBLICATIONS

R.P. Colwell, et al. "A VLIW architecture for a trace scheduling compliler" *IEEE Transactions on Computers* vol. C–37, No.8 pp. 967–979 1988.
G.R. Beck, et al. "The Cydra 5 mini–supercomputer: architecture & implementation" *The Journal of Supercomputing* vol. 7, No. 1/2 pp. 143–180 1993.
A.E. Charlesworth "An approach to scientific array processing: the architectural design of the AP–102B/FPS–164 family" *IEEE Computer* vol. 14, No. 9 pp. 18–27 1981.

*Primary Examiner*—Robert B. Harrell
*Attorney, Agent, or Firm*—Whitham, Curtis, Whitham & McGinn; Jay P. Sbrollini

[57] ABSTRACT

Object code compatibility is provided among VLIW processors with different organizations. The object code can be executed by sequential processors, thus providing backward compatibility with scalar and superscalar processors. A mechanism is provided which allows representing VLIW programs in an implementation independent manner. This mechanism relies on instruction cache (I-cache) reload/access processes which incorporate implementation-dependent features into a VLIW program. In this way, programs are represented in main memory in an implementation independent manner (i.e., without reflecting the organization of the processor where they are executed), the implementation-specific aspects are introduced as part of the instruction cache reload/fetch processes, and the simplicity in instruction dispatch logic that is characteristic of VLIW processors is preserved. This allows for object code compatibility among VLIW processors with different organizations. This is done by decomposing the process into tasks performed at I-cache reload time and tasks performed at I-cache access time, requiring simpler logic to perform the translation. The resulting VLIWs can be executed starting from any operation within them (e.g., branching into them is possible), and there is a one-to-one correspondence among primitive operations in main memory and in the I-cache. Moreover, a framework is provided for generating (compiling) code which exploits the parallel execution features of a VLIW processor (parallelized code) which is also executable by a sequential processor without unduly affecting performance.

7 Claims, 5 Drawing Sheets

VLIWs in I-cache

| L0:<br>if (C0)<br>br t1 | if (C1)<br>br t2 | op3 | if (C3)<br>br t3 | op1 | op5 | br A | t3:<br>op2 |
|---|---|---|---|---|---|---|---|
| br B | t2:<br>op4 | if (C4)<br>sk t4 | op5 | br D | op1 | br C | t1:<br>if (C2)<br>sk t5 |
| op1 | op4 | br C | op6 | op7 | br E | | |

FIG.4

VLIWs in I-cache

| L0:<br>if (C0)<br>br t1 | if (C1)<br>br t2 | op3 | if (C3)<br>br t3 | op1 | op5 | br A | t3:<br>op2 |
|---|---|---|---|---|---|---|---|
| br B | t2:<br>op4 | if (C4)<br>br t4;<br>ibr x1 | x1:<br>op5 | br D | t4:<br>op1 | br C | t1:<br>if (C2)<br>sk t5 |
| op1 | op4 | br C | op6 | op7 | br E | | |

OBJECT CODE COMPATIBLE REPRESENTATION OF VERY LONG INSTRUCTION WORD PROGRAMS

BACKGROUND OF THE INVENTION

1. Field of the Invention

The present invention generally relates to parallel execution of primitive instructions in data processors and, more particularly, to a mechanism for the representation of very long instruction word (VLIW) programs in such a way that the programs do not reflect the organization (i.e., implementation) of the processor where they are executed.

2. Background Description

Very long instruction word processors are a suitable alternative for exploiting instruction-level parallelism in programs; that is, executing more than one basic (i.e., primitive) instruction at a time. These processors contain multiple functional units, fetch from the instruction cache a very long instruction word (VLIW) containing several primitive instructions, and dispatch the entire VLIW for parallel execution. These capabilities are exploited by compilers which generate code that has grouped together independent primitive instructions executable in parallel. The processor has relatively simple control logic because it does not perform any dynamic scheduling nor reordering of operations, as is the case in superscalar processors.

An apparent limitation of VLIW processors is the lack of object code compatibility with the object code used by sequential (i.e., scalar and superscalar) processors, because such a code has not been parallelized for VLIW. Conversely, an apparent limitation is that the code used by a VLIW processor cannot be used by a scalar or superscalar processor, because the parallel code uses features that exist only in VLIW implementations. Furthermore, another apparent limitation is the lack of object code compatibility for VLIW implementations having varying degrees of parallel execution capabilities, because the code reflects the detailed structure (e.g., parallel execution capabilities) of one specific implementation, which is different from the others. As a result, the VLIW approach appears as unable to enhance an existing family of scalar and superscalar processors, which has lead to the perception that VLIW processors are limited to their suitability for being adopted.

The perceived limitations described above are actually a consequence of how the implementations of the VLIW concept have been carried out in the past. See, for example, R. P. Colwell, R. P. Nix, J. J. O'Donnell, D. B. Papworth and P. K. Rodman, "A VLIW architecture for a trace scheduling compiler", IEEE *Transactions on Computers*, Vol. C-37, No. 8, pp. 967–979, 1988; G. R. Beck, D. W. L. Yen and T. L. Anderson, "The Cydra 5 mini-supercomputer: architecture and implementation", *The Journal of Supercomputing*, Vol. 7, No. 1/2, pp. 143–180, 1993; and A. E. Charlesworth, "An approach to scientific array processing: the architectural design of the AP-120B/FPS-164 family", IEEE *Computer*, Vol. 14, No. 9, pp. 18–27, 1981. Processors such as those reported in these articles have made visible features of the implementation to the compiler/programmer, including the number, types and location of the functional units, under the assumption that the compiler could better exploit the hardware if it has good knowledge of its features and limitations. VLIW programs have been represented as sets of VLIWs which specify exactly the operations performed in each function unit on a cycle-by-cycle basis, as determined by the compiler (known as static scheduling). This is drastically different from the approach used in conventional scalar and superscalar processors, which at run time perform the analysis and decisions regarding which operations are executed in each cycle (known as dynamic scheduling), so that the detailed features of the processor need not be known by the compiler. In other words, the separation among architecture and implementation that is common practice in processor design for scalar and superscalar implementation has been sacrificed in VLIW implementations, in order to better exploit the capabilities of the hardware by the compiler/programmer.

Although the benefits of exposing the details of the implementation to the compiler/programmer are clear, this has lead to the perception that such an exposure is a requirement for a VLIW processor. Furthermore, there have been very few proposals on how to describe or represent a VLIW program without depending on the specific aspects of an implementation, so that the perceived requirement has been sustained.

SUMMARY OF THE INVENTION

It is therefore an object of the present invention to eliminate the exposure of a VLIW processor implementation at the architecture level and thereby achieve object code compatibility in a processor architecture.

It is another object of the invention to provide object code compatibility across VLIW processors having different latencies and varying levels of parallelism.

It is a further object of the invention to provide object code compatibility among VLIW processors with different organizations, which object code can be executed by sequential processors.

According to the present invention, there is provided a mechanism which allows representing VLIW programs in an implementation independent manner. The invention relies on instruction cache (I-cache) reload/access processes which incorporate implementation-dependent features into a VLIW program. In this way, programs are represented in main memory in an implementation independent manner (i.e., without reflecting the organization of the processor where they are executed), the implementation-specific aspects are introduced as part of the instruction cache reload/fetch processes, and the simplicity in instruction dispatch logic that is characteristic of VLIW processors is preserved. This allows for object code compatibility among VLIW processors with different organizations. Moreover, the VLIW programs represented in this manner can also be executed by sequential processors, so that the invention allows backwards object code compatibility with scalar and superscalar implementations.

In this invention, a new approach to achieve object code compatibility in a processor architecture is taken, allowing the same program to be executed in scalar, superscalar and VLIW implementation of the same architecture. The invention relies on interpreting/representing the programs in main memory in a manner that conveys, in straightforward and implementation independent form, the fine grain parallelism extracted by the compiler/programmer. This form is translated into an implementation dependent VLIW format in the I-cache. This is done by decomposing the process into tasks performed at I-cache reload time and tasks performed at I-cache access time, requiring simpler logic to perform the translation that is better suited to exploit the parallel execution capabilities of a VLIW implementation. The resulting VLIWs can be executed starting from any operation within them (e.g., branching into them is possible), and there is a one-to-one correspondence among primitive operations in main memory and in the I-cache. Moreover, the invention provides a framework for generating (compiling) code which exploits the parallel execution features of a VLIW processor (parallelized code) which is also executable by a sequential processor without unduly affecting performance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention relies on the following aspects, described in more detail later:

A VLIW program is a set of tree-instructions (TIs) which are stored in main memory. Each tree-instruction consists of an unlimited multiway branch and an unlimited number of primitive operations associated with the arcs of the tree.

The tree-instructions in main memory are translated into variable length VLIWs at I-cache replacement time; that is, the I-cache reload logic reads the TIs from main memory, formats them as variable length VLIWs, and stores them in the I-cache. A complex TI which exceeds the resources of the processor is decomposed into two or more VLIWs which are executed sequentially. This decomposition requires the ability to prune complex TIs at I-cache replacement time.

The processor fetches fixed length VLIW s for execution from the I-cache. At I-cache access time, short VLIWs in the I-cache are expanded to match the size and resources of VLIWs in the processor. This expansion consists of aligning the operations to suitable positions within the fixed length VLIW and introducing no-op operations to fill empty slots.

As a result, the processor specific features that are inherent to an implementation are incorporated during the I-cache formatting and I-cache accessing processes. This includes aspects such as maximum number of branches and primitive operations per VLIW, location of operations within the VLIW, among others. In other words, the implementation independent TIs in main memory are translated into implementation dependent VLIWs, transparently to the compiler/programmer.

Figure 1:
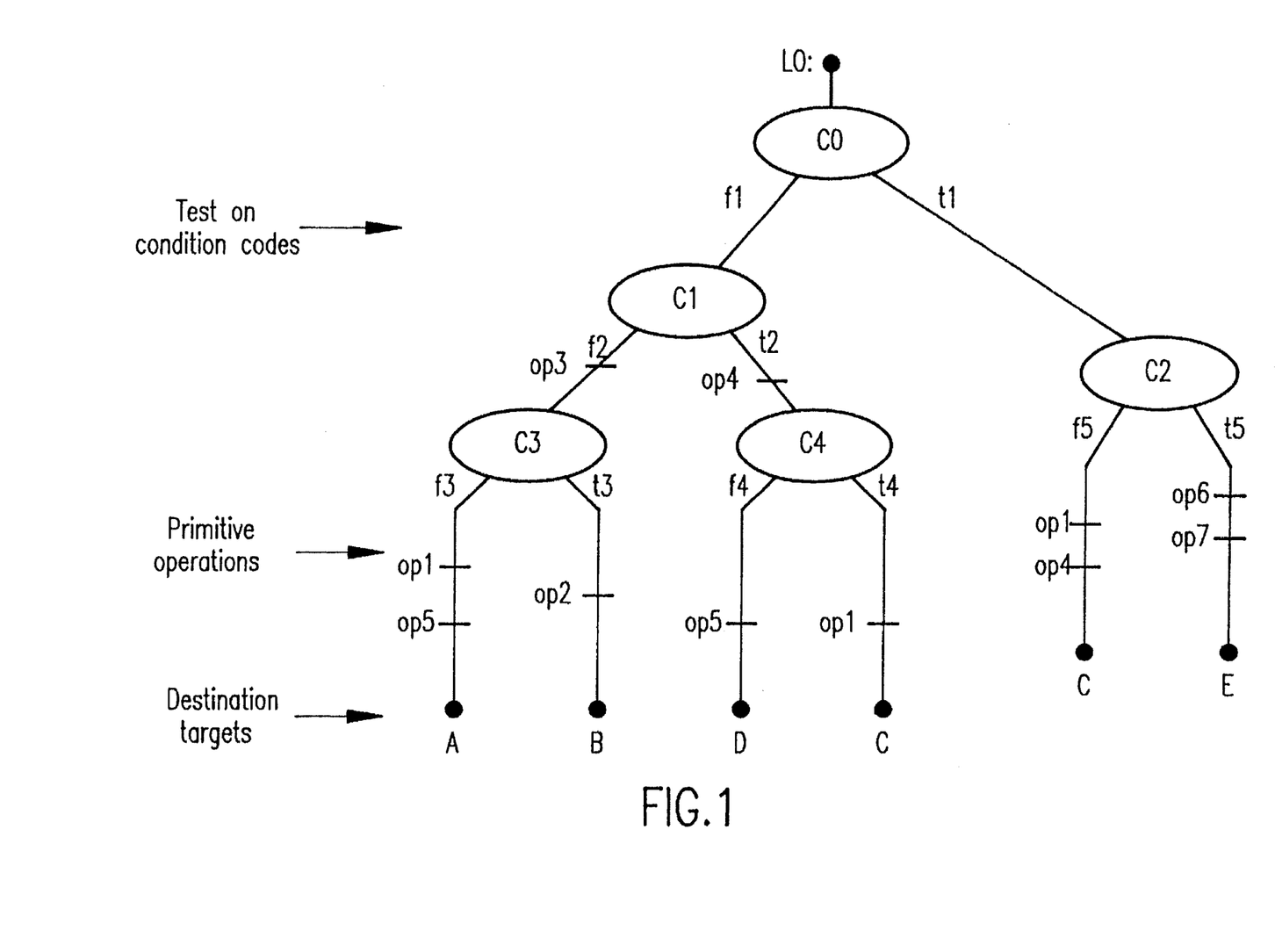
FIG. 1 is a diagram of a tree-instruction illustrating the basic characteristics of a program in main memory.

Referring now to the drawings, and more particularly to FIG. 1, there is shown an example of a tree instruction. In the practice of the invention, a program in main memory of a computer system consists of a set of tree instructions (TIs) having the following characteristics:

Tree instructions are composed of an unlimited number of internal nodes and an unlimited number of arcs.

Internal nodes correspond to conditional branch instructions; that is, binary tests on condition codes. Each internal node generates two arcs. The right outgoing arc is selected if the outcome of the test is true; otherwise, the left outgoing arc is selected. The set of internal nodes generates a multiway tree. Only one path within the tree (the selected path) is active at execution time, as determined by the outcome of the tests on the condition codes.

Each leaf corresponds to a destination target; that is, the identification of the next tree instruction to be executed when the leaf is in the selected path.

Primitive operations are associated with the arcs. Only those operations associated with the arcs on the selected path of the tree are actually executed.

Branches and primitive operations on each path of the tree are subject to sequential semantics; that is, branches and primitive operations are subject to a precedence order determined by their appearance on the tree. This implies that, for parallel execution, branches and operations that appear later in a path should not use or target a resource which is the target of a previous operation in the path. If that is not the case, the operations are dependent and their execution must be serialized.

Due to the requirement for sequential semantics, a TI may take more than one execution cycle even in a VLIW processor. This feature is the key factor for achieving object code compatibility among sequential and VLIW implementations. It is expected that all the operations placed in a tree instruction by a VLIW compiler are independent (i.e., executable in parallel), but such operations can also be executed sequentially without conflicts. In addition, the requirement for sequential semantics is the key factor for achieving object code compatibility when a TI is executed in an implementation having fewer parallel capabilities than those specified in the TI.

Tree instructions are represented in the main memory in sequential form, as shown in the table below with reference to FIG. 1.

```
L0: if (C0) skip t1
f1: if (C1) skip t2
f2: op3
    if (C3) skip t3
f3: op1
    op5
    branch A
t3: op2
    branch B
t2: op4
    if (C4) skip t4
f4: op5
    branch D
t4: op1
    branch C
t1: if (C2) skip t5
f5: op1
    op4
    branch C
t5: op6
    op7
    branch E
```

Each primitive operation or branch is assumed to be contained in a single memory word. This sequential representation allows for the description of arbitrarily complex tree instructions, without any reference to the resources required in an implementation for their execution. The sequential representation is obtained by traversing the tree instruction in a depth-first manner, listing the tests on the condition codes and the primitive operations that are executed when the corresponding path of the tree is selected. Each testing of a condition code is followed by a skip primitive, which corresponds to a flow control operation within the tree instruction indicating where the description of the tree continues. All destination targets are represented as unconditional branch instructions which specify the next TI to be executed. Consequently, the end of a tree instruction is delimited by an instruction following a branch which is not reachable by any skip instruction in the tree.

Conversely, any program written as described above can be interpreted as a set of TIs by traversing the program one instruction at a time, adding internal nodes to TIs for each conditional branch instruction, adding operations to the corresponding arcs, and ending a TI upon encountering an instruction which is not reachable from a skip instruction.

As can be inferred from FIG. 1 and the above table, any point within a tree instruction can also correspond to the starting point of another tree instruction, thus allowing the reuse of the object code representing a TI. For example, the arc labeled t2 in FIG. 1 could be used as a starting point for a tree instruction containing op4, the test on c4 and the operations that follow such a test. Similarly, the sequence (op1, op5, A) can also be used as a simple tree instruction. As a result, branching into a tree instruction is possible, leading to the execution of a simpler TI. In terms of the sequential representation, for example, branching into the instruction labeled t2 in FIG. 1 (destination target of another tree instruction) leads to a TI composed of the operations starting at t2 up to instruction "branch c". The end of this tree is detected when reaching the instruction t1 because that label is not found in any skip instruction among the operations starting from label t2.

The execution of a complex tree instruction in a processor with limited resources is based on the ability to decompose the complex TI into simpler ones which are executed sequentially, without changing the semantics of the corresponding program. This feature is referred to as pruning the tree instruction. As a result of pruning, a complex tree instruction is executed in several cycles, depending on the resources available in the target processor. Pruning is performed as part of the I-cache reload process which translates the tree instructions into variable length VLIWs, so that a complex TI in main memory is translated into two or more implementation dependent VLIWs in the I-cache.

Figure 2:
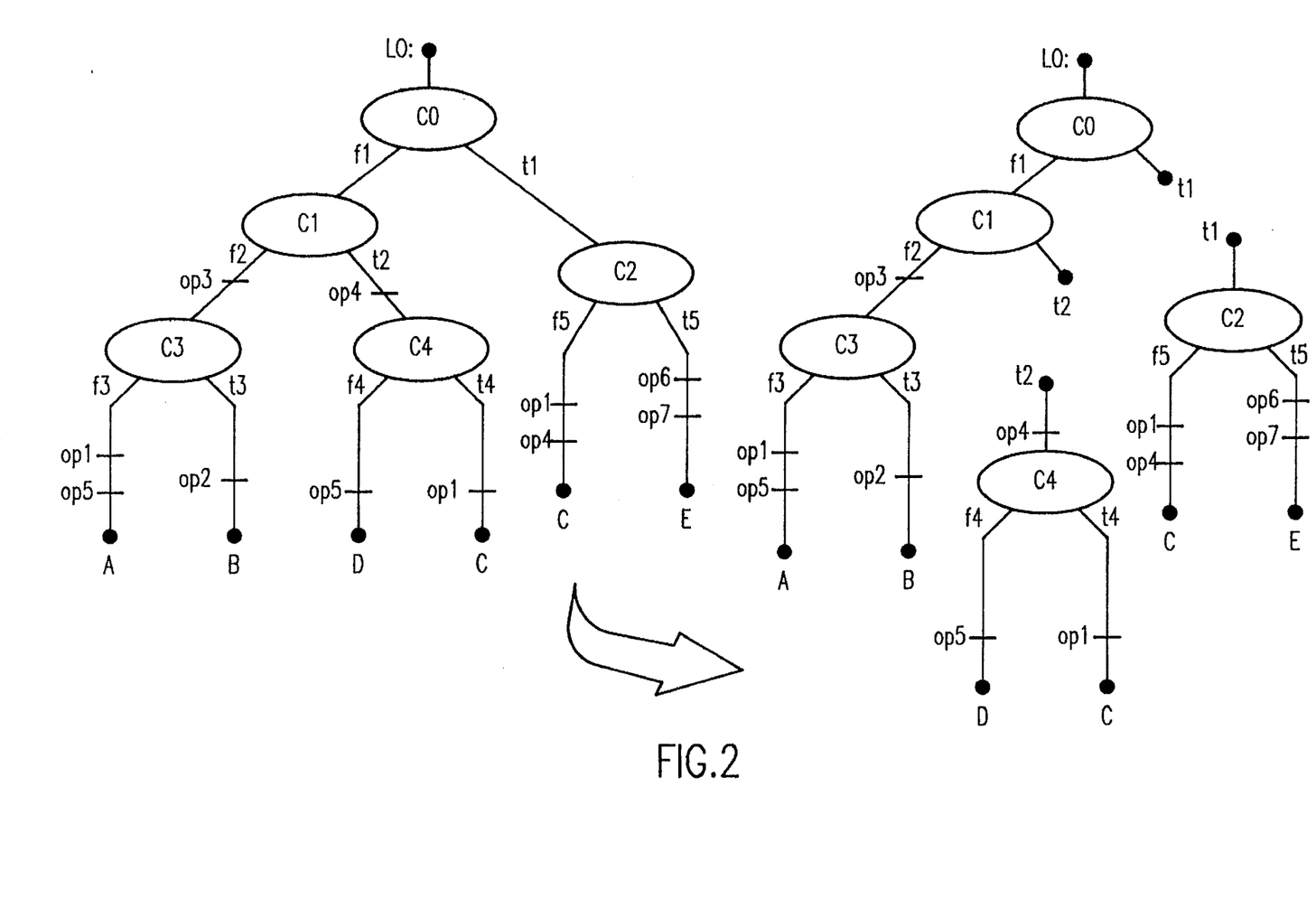
FIG. 2 is a diagram of the tree-instruction of FIG. 1 illustrating a pruning operation.

Pruning is possible because the operations in the paths of the tree are subject to sequential semantics. Consequently, it is possible to replace any outgoing arc from an internal node by a leaf whose destination target corresponds to the part of the tree which is being pruned. For example, assume that the tree instruction in FIG. 1 is to be transformed into TIs having at most four leaves (i.e., four destination targets). As shown in FIG. 2, the original tree instruction is transformed by pruning at the arcs labeled t1 and t2, which generates three TIs; one having four destination targets, and two having just two destination targets.

Since operations on the pruned portions of the tree are independent from the ones in the corresponding paths of the previous portion of the TI, they can be executed after the previous part of the tree has been executed (i.e., in the next execution cycle) without problems. In terms of the sequential representation, pruning implies replacing the corresponding skip instructions by conditional branch instructions, indicated by the table below:

```
L0: if (C0) skip t1          L0: if (C0) branch t1
f1: if (C1) skip t2          f1: if (C1) branch t2
f2: op3                      f2: op3
    if (C3) skip t3              if (C3) skip t3
f3: op1                      f3: op1
    op5                          op5
    branch A                     branch A
t3: op2                      t3: op2
    branch B                     branch B
t2: op4                   →
    if (C4) skip t4          t2: op4
f4: op5                          if (C4) skip t4
    branch D                 f4: op5
t4: op1                          branch D
    branch C                 t4: op1
t1: if (C2) skip t5              branch C
f5: op1
    op4                      t1: if (C2) skip t5
    branch C                 f5: op1
t5: op6                          op4
    op7                          branch C
    branch E                 t5: op6
                                 op7
                                 branch E
```

Note that, in the resulting sequential representation, the instructions labeled t2 and t1 follow an unconditional branch instruction and are not reachable by a skip instruction from the preceding tree instruction, so they correspond to the starting point of independent TIs.

Consider now the case of a tree instruction that needs to be pruned because it exceeds the maximum number of resources of some type (for instance, arithmetic logic units) available in an implementation. For example, assume that the tree instruction shown in FIG. 1 needs to be decomposed so that it can be executed by a processor that accepts a maximum of six primitive operations per VLIW. In such a case, the arcs labeled t4 and t1 are replaced by branches, so that the corresponding instructions become the first operation of new TIs. That is, the original TI is decomposed into three TIs, the first one having six operations, the second one having one operation, and the last one having four operations.

The decomposition of a complex tree instruction as described above preserves the number of operations (including skip and branches) across the complex tree instruction as well as in the decomposed TIs. In other words, the decomposition has serialized the execution of the tree but has not changed the total number of basic operations required and, therefore, has not changed the number of memory words needed to represent the decomposed version. The underlying assumption is that all the primitive operations that appear on one arc of the complex tree also appear together in a simpler tree, so that pruning is performed at skip instructions. However, if this is not possible or convenient due to lack of resources (that is, there are more operations in one arc than the maximum degree of parallel execution available in an implementation), then the complex tree instruction can be decomposed by adding an extra implicit unconditional branch instruction whose target address is the next sequential memory address, effectively splitting a particular arc into two arcs. Since the decomposition is carried out in I-cache replacement time, the space required to encode this unconditional branch is needed only inside the I-cache but not in the representation of the program in main memory. Furthermore, since the target destination of this branch is the next sequential memory address, it can be encoded with just a single bit.

Conventional scalar and superscalar processors can directly execute the sequential representation of compiler generated tree instructions because there are no special requirements imposed by this representation. Thus, a compiler can perform code optimizations which deliver good performance on a VLIW implementation without degrading the performance achieved when the same program is executed in a scalar or superscalar implementation. That is, the generation of code in the form of TIs tuned for a VLIW implementation achieves backward object code compatibility with scalar and superscalar implementations of the same architecture.

As has already been stated, tree instructions are translated into VLIWs at I-cache reload time. Ideally, the VLIWs in the I-cache correspond to tree instructions whose execution requirements match the parallel execution capabilities of the VLIW processor. This requires that larger TIs be decomposed into simpler ones, and smaller TIs are filled with no-op operations. However, in order to maintain one-to-one correspondence among operations in main memory and operations in I-cache (thus preserving the features of TIs discussed earlier), the I-cache must be capable of holding variable length VLIWs, and I-cache lines must be able to contain more than one such VLIW. For these purposes, I-cache lines are augmented with extra bits which encode information such as the size and location of each VLIW within the I-cache line, the number and type of operations per VLIW, and the like. All of this information is extracted from the TIs at I-cache reload time. As a result, the translation of TIs into VLIWs becomes a two step process. In the first step, at I-cache reload time, TIs are translated into variable length VLIWs whose maximum size matches the capabilities of the VLIW processor. Small TIs are translated into small VLIWs without expansion. Additional information is added in the I-cache lines, which identify the starting and ending position of VLIWs within the lines. In the second step, at I-cache access time, the memory address is used to extract from the corresponding I-cache line the variable length VLIW starting at that address, which is expanded to match the capabilities of the VLIW processor. The expansion is achieved using the extra information encoded in the same I-cache line.

The translation process uses the following assumptions and must perform the following tasks, the details of which are determined by the specific implementations. Assumptions:

Main memory is divided into main memory blocks, whose size is implementation dependent.

Each primitive operation in a tree instruction, including skips and branches, is encoded in one word in main memory.

In addition to the destination targets explicitly specified in a tree instruction, the translation logic can insert unconditional branch instructions whose destination is the next sequential memory address. Such branch instructions are encoded in separate bits within the VLIW.

Each tree instruction is fully contained within a main memory block but may start anywhere within a block. The first word within a block corresponds to the first operation in a tree instruction (i.e., TIs may not straddle a block). Additional TIs may be contained in the block.

If the last instruction in a main memory block is not the end of a TI, an implicit branch to the next sequential memory address is assured.

Figure 3:
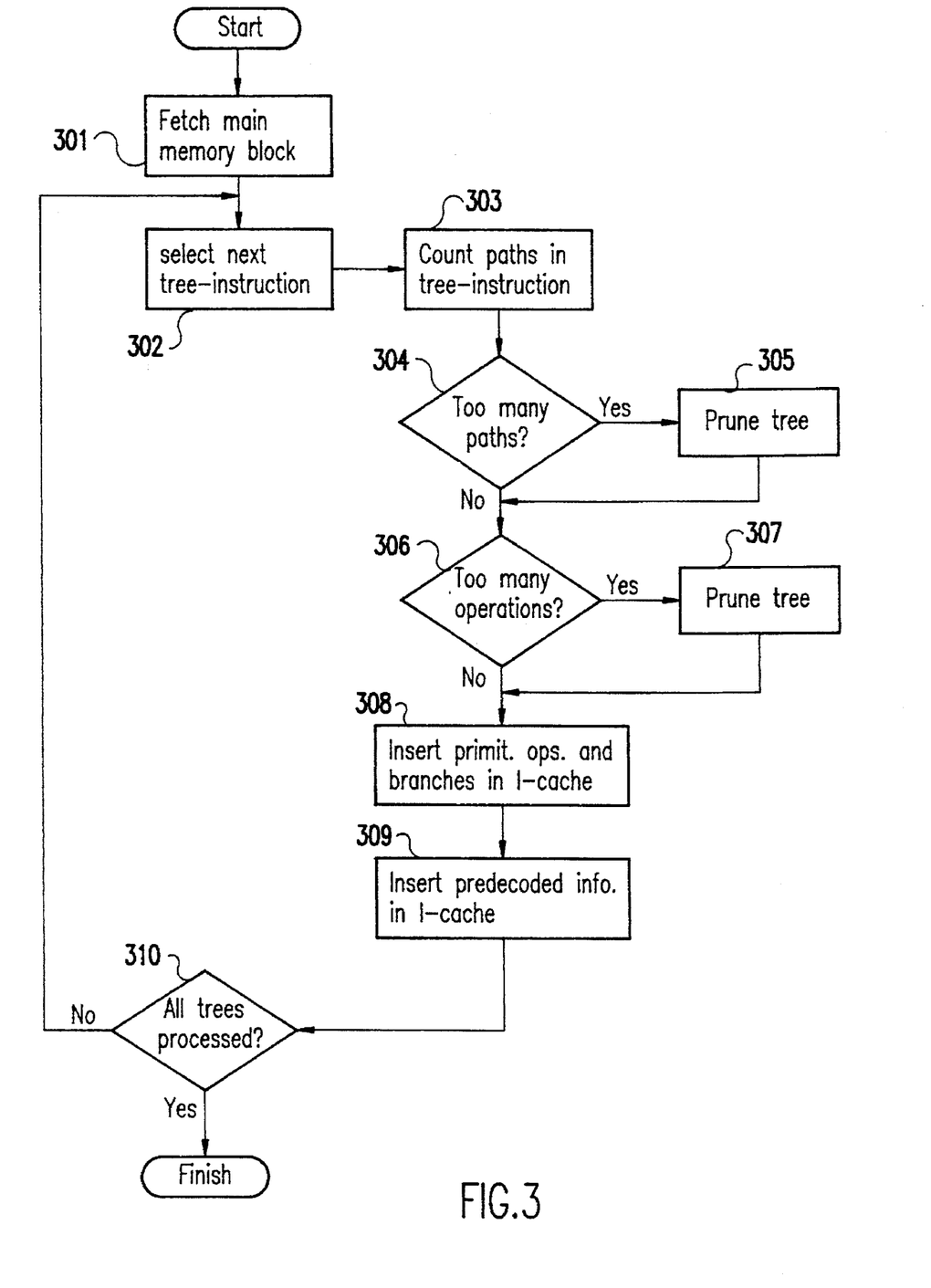
FIG. 3 is a flow diagram showing the logic of the translation process according to the invention.

The translation process is illustrated in the flow diagram of FIG. 3, to which reference is now made. In function block 301 a memory block is fetched from main memory. Starting from the first word in the block, the first tree instruction is selected in function block 302. In function block 303, the number of paths in the corresponding multiway branch is determined from the skip instructions. Each skip operation originates an additional path, and each path ends with an unconditional branch instruction. A test is made in decision block 304 to determine if the number of paths in the tree instruction exceeds the multiway branch capabilities of the processor. If so, the skip instructions whose target is farthest away are replaced in function block 305 by branch instructions with the same destination target, leaving only as many tree-paths as the implementation allows. In other words, the corresponding tree is pruned. A further test is made in decision block 306 to determine if the number of primitive operations exceeds the number of functional units in the processor, either in the entire tree or in a particular tree-path. If so, the tree is pruned in function block 307 by replacing the skip instructions, whose target is beyond the instruction where the number of resources is exceeded, by branch instructions with the same destination target. In addition, the tree-path containing the operations where the number of resources is exceeded is broken into different VLIWs by inserting an implicit unconditional branch to the next sequential address. Then, in function block 308, the primitive operations and branches collected while traversing the tree instruction are inserted into the I-cache line, in the form of a VLIW. Any pre-decoded information regarding the VLIW (e.g., masks), as required by a specific implementation, are inserted in function block 309. A test is made in decision block 310 to determine if there are operations in the memory block not yet assigned to VLIWs. If so, the process loops back to function block 302 to repeat the process until all operations in the memory block have been assigned to VLIWs. When all operations have been assigned, the process ends.

Figure 4:
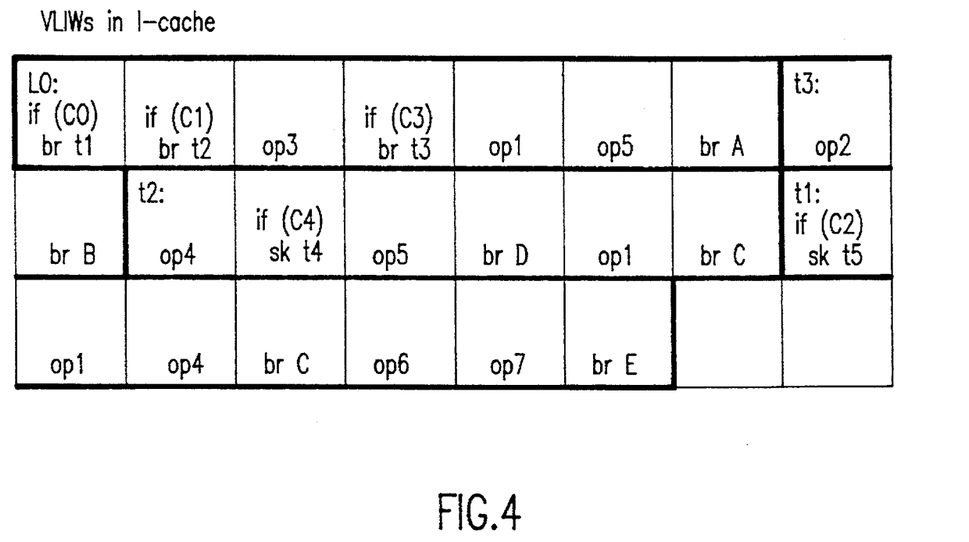
FIG. 4 is a memory map showing variable length VLIWs in I-cache.

The translation process is illustrated by way of example. For the purposes of the example, consider the tree instruction listed in the first table which must be translated into variable length VLIWs to be stored in I-cache with lines of length eight words. The TI starts at label L0 and consists of twenty-two operations. Furthermore, assume that the processor is capable of executing a four-way branch and four primitive operations per VLIW, so that the maximum size of the variable length VLIWs is four branches and four operations, and that VLIWs can straddle the boundaries of an I-cache line; that is, a VLIW may be contained in two consecutive I-cache lines. If all the operations in the TI are independent (i.e., executable in parallel), then the outcome of the translation process is as depicted in FIG. 4. The TI is decomposed into four variable length VLIWs, as indicated by the heavy lines in FIG. 4, some VLIWs straddle the I-cache line boundaries, and some of the skip instructions have been replaced by branches. The first VLIW (labeled L0) contains four branches and three operations. The VLIW labeled t3 consists of just one operation and a branch. The VLIW labeled t2 specifies two branches, one skip instruction and three operations. The VLIW labeled t1 contains one skip, two branches and four basic operations. Additional bits (not shown in FIG. 4) specify the boundaries of VLIWs within the I-cache line, as well as the location of primitive operations and branches within the lines, which simplify accessing the I-cache.

Figure 5:
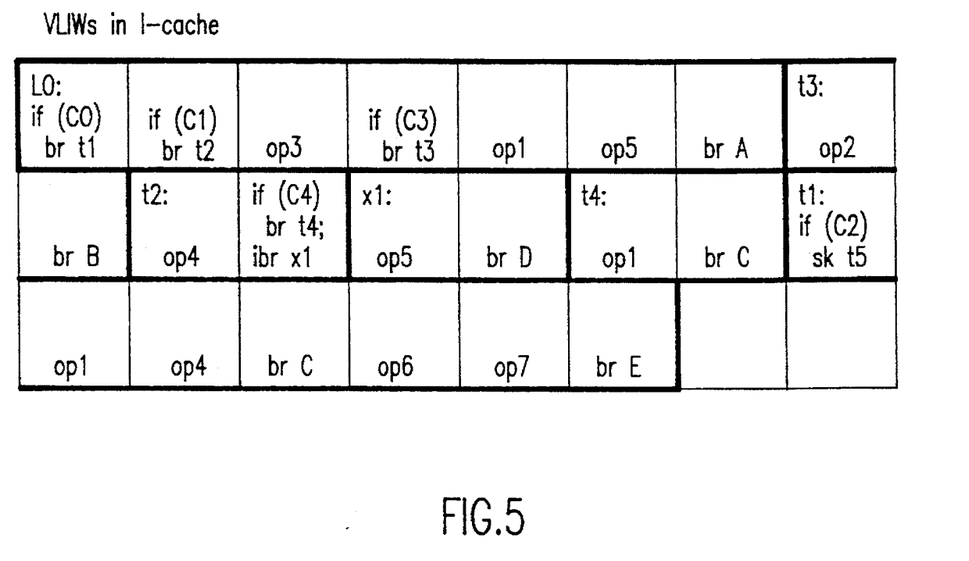
FIG. 5 is a memory map showing variable length VLIWs in I-cache for the case of dependencies.

On the other hand, assume that a particular processor has implemented the optional feature of checking whether there are dependencies among the operations in the TI, so that op5 depends on op4 in the path leading to target D. In such a case, the execution of this TI must be serialized so that the dependencies are correctly preserved. This is accomplished by inserting an implicit branch to the next sequential memory address at instruction "if (c4) br t4", leading to separate VLIWs as depicted in FIG. 5. The implicit branch is indicated as "ibr x1", and a new label x1 has been introduced for instruction op5. This results in six VLIWs, as depicted in FIG. 5.

If an implementation does not allow splitting a VLIW across two I-cache lines as assumed in the example, the translation process would insert implicit branches at the end of the lines containing partial VLIWs (branches to the next sequential memory address, using the mechanism described above). Such partial VLIWs would then be executed sequentially.

Figure 6:
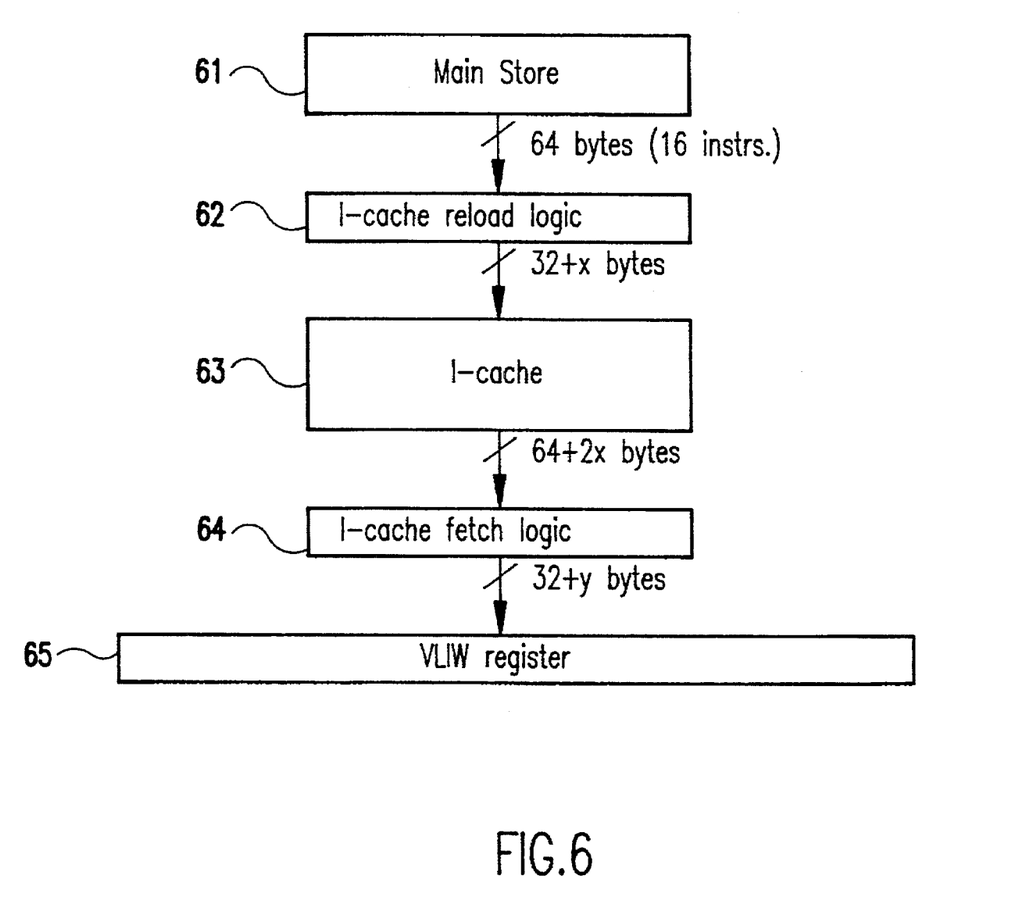
FIG. 6 is a block diagram of a VLIW processor system.

The overall structure of a VLIW processor system which uses the features described is shown in FIG. 6, which shows in block diagram form the path from main memory 61 to the processor. By way of example, assume that main memory blocks are 32 words long (128 bytes) so that the maximum size of a TI is 32 operations and that the processor is capable of executing a four-way branch and four operations per VLIW. Moreover, assume the I-cache reload logic 62 fetches main memory blocks at a rate of 16 words (64 bytes) per access (e.g., a main memory block access requires two accesses) and generates I-cache lines of 32×x bytes. The base 32 bytes contain eight operations, whereas the extra bytes contain the additional information extracted from the TIs regarding the variable length VLIWs, such as the number and position of the variable length VLIWs, the location of operations and branches, and the location of implicit branches. On the other side of the I-cache 63, the fetch logic 64 accesses 64+2×x bytes, and extracts 32+y bytes which are delivered to the VLIW register 65 of the processor for execution. The base 32 bytes contain four branches and four primitive operations, potentially including no-ops in the case of incomplete VLIWs, aligned as required by the position of the functional units within the processor. The extra bytes are used for predecoded representation of the VLIW contents which simplify its execution, if that is advantageous. The number of extra bits generated by the I-cache reload logic 62 and I-cache access logic 64 (values of x and y, respectively) are determined by the features of a particular VLIW processor implementation.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of storing in computer memory and translating very long instruction words (VLIWs) for execution by VLIW processors with different organizations and providing object code compatibility with scalar and superscalar processors, said method comprising the steps of:

storing in a computer memory of a processor associated with the computer memory a program to be executed by the processor, the program being stored in the computer memory as a set of tree instructions composed of an unlimited number of internal nodes and an unlimited number of arcs, said internal nodes corresponding to conditional branch instructions and generating two arcs, primitive operations of said processor being associated with said arcs;

accessing said computer memory to fetch a memory block containing a tree instruction;

decomposing a fetched tree instruction into a plurality of sequential instructions as variable length VLIWs according to resources of the processor associated with the computer memory and on which the program is to be executed;

writing the variable length VLIWs in a line of an instruction cache (I-cache) for access by said processor associated with the computer memory; and executing by said processor associated with the computer memory the variable length VLIWs written in said I-cache.

2. The method recited in claim 1 wherein said processor associated with the computer memory is a VLIW processor, said VLIW processor having a fixed length VLIW register, said method further comprising the steps of:

fetching a variable-length VLIW from the I-cache; and expanding and aligning said variable length VLIW to fit the fixed length of the VLIW register.

3. A method of providing object code compatibility among very long instruction word (VLIW) processors with different organizations and backward compatibility with scalar and superscalar processors by representing VLIW programs in a hardware implementation independent manner, said method comprising the steps of:

storing in computer memory of a processor associated with the computer memory a program to be executed by the processor, the program being stored in the computer memory as a set of tree instructions composed of internal nodes corresponding to conditional branch instructions and generating two arcs, primitive operations of a processor being associated with said arcs; and introducing implementation-specific aspects of the program stored in the computer memory as part of an instruction cache (I-cache) reload/fetch process by decomposing the program into tasks performed at I-cache reload time and tasks performed at I-cache access time.

4. The method recited in claim 3 wherein the step of introducing implementation-specific aspects of the program comprises the steps of:

accessing said computer memory to fetch a memory block containing tree instructions; and decomposing each fetched tree instruction into a plurality of sequential instructions according to resources of the processor associated with the computer memory on which the program is to be executed.

5. The method recited in claim 4 wherein the processor associated with the computer memory is a VLIW processor having a fixed length VLIW register and said sequential instructions are variable length VLIWs, further comprising the steps of:

writing the variable length VLIWs in a line of an instruction cache (I-cache) for access by said processor;

fetching a variable length VLIW from the I-cache;

expanding and aligning the fetched variable length VLIW to fit the fixed length VLIW register.

6. The method recited in claim 5 wherein in the step of decomposing each fetched tree instruction into a plurality of sequential instructions comprises the steps of:

determining a number of tree-paths in a corresponding multiway branch from skip instructions in the program, each skip instruction originating an additional path and each path ending in an unconditional branch instruction;

determining if the number of paths exceeds the resources of the processor on which the program is to be executed; and if the number of paths exceeds the resources of the processor on which the program is to be executed, replacing skip instructions whose target is farthest away by branch instructions with the same target.

7. The method recited in claim 6 further comprising the steps of:

determining if a number of primitive operations exceeds a number of functional units in the processor on which the program is to be executed;

if the number of primitive operations exceeds the number of functional units, replacing skip instructions whose target is beyond an instruction where the number of resources is exceeded by branch instructions with the same target; and breaking the tree-path containing the operations where the number of resources is exceeded into different VLIWs by inserting an implicit unconditional branch to a next sequential address.

* * * * *